(12) United States Patent
Sullivan

(10) Patent No.: US 7,650,510 B2
(45) Date of Patent: Jan. 19, 2010

(54) METHOD AND APPARATUS FOR IN-LINE SERIAL DATA ENCRYPTION

(75) Inventor: Patrick L. Sullivan, Minnetonka, MN (US)

(73) Assignee: General Dynamics Advanced Information Systems, Inc., Fairfax, VA (US)

( * ) Notice: Subject to any disclaimer, the term of this patent is extended or adjusted under 35 U.S.C. 154(b) by 457 days.

(21) Appl. No.: 10/426,705

(22) Filed: Apr. 29, 2003

(65) Prior Publication Data

US 2004/0054914 A1 Mar. 18, 2004

Related U.S. Application Data

(60) Provisional application No. 60/376,580, filed on Apr. 30, 2002.

(51) Int. Cl.
*G06F 21/00* (2006.01)
*G06F 21/02* (2006.01)

(52) U.S. Cl. .......................... 713/189; 713/190; 725/2; 725/3; 725/4; 725/5

(58) Field of Classification Search .................. None
See application file for complete search history.

(56) References Cited

U.S. PATENT DOCUMENTS

| | | | | |
|---|---|---|---|---|
| 4,386,416 A | * | 5/1983 | Giltner et al. ................... | 710/68 |
| 4,787,027 A | * | 11/1988 | Prugh et al. ..................... | 710/65 |
| 4,831,555 A | * | 5/1989 | Sansone et al. ............ | 358/1.14 |
| 5,164,986 A | * | 11/1992 | Bright ......................... | 380/273 |
| 5,325,430 A | * | 6/1994 | Smyth et al. ................. | 713/192 |
| 5,333,198 A | * | 7/1994 | Houlberg et al. ............. | 380/270 |
| 5,384,847 A | * | 1/1995 | Hendrickson et al. ....... | 380/247 |
| 5,615,262 A | | 3/1997 | Guy et al. | |
| 5,675,654 A | | 10/1997 | Ryan ............................. | 380/48 |
| 5,765,152 A | * | 6/1998 | Erickson ........................ | 707/9 |

(Continued)

FOREIGN PATENT DOCUMENTS

EP 0 820 017 1/1998

(Continued)

OTHER PUBLICATIONS

Daemen and Rijmen, "AES Proposal: Rijndael", Mar. 1999.*

(Continued)

*Primary Examiner*—Syed A. Zia
(74) *Attorney, Agent, or Firm*—Steptoe & Johnson LLP

(57) ABSTRACT

A method and apparatus for real-time in-line encryption of data transmitted over a serial channel from a source device to a target device. An encryption unit includes logic configured to receive data packets including headers with control information and data on the channel, which may be a fiber channel bus, serial ATA, serial SCSI, USB or the like. The encryption unit encrypts the data and passes the control information to the target device along with the encrypted data. The encryption unit may filter, convert or reject predetermined commands or types of information in the header to prevent covert channel transmissions. There may be one or multiple source devices, e.g. host computers, and one or multiple target devices, e.g. storage systems, configured in a variety of network topologies. The encryption unit also decrypts data and remaps control information transmitted from the target device(s) to the source device(s).

24 Claims, 5 Drawing Sheets

U.S. PATENT DOCUMENTS

| | | | | |
|---|---|---|---|---|
| 5,778,071 | A | * | 7/1998 | Caputo et al. ............... 713/159 |
| 5,815,571 | A | * | 9/1998 | Finley ........................ 713/189 |
| 5,829,054 | A | | 10/1998 | Ehlig et al. ................. 711/202 |
| 5,845,281 | A | * | 12/1998 | Benson et al. ................. 707/9 |
| 5,867,736 | A | * | 2/1999 | Jantz ........................... 710/74 |
| 5,901,228 | A | * | 5/1999 | Crawford .................... 705/34 |
| 5,915,025 | A | * | 6/1999 | Taguchi et al. ............... 380/44 |
| 5,961,626 | A | | 10/1999 | Harrison et al. |
| 6,073,142 | A | * | 6/2000 | Geiger et al. ............... 715/500 |
| 6,098,056 | A | * | 8/2000 | Rusnak et al. ................ 705/75 |
| 6,185,687 | B1 | | 2/2001 | Sako et al. .................. 713/200 |
| 6,219,422 | B1 | | 4/2001 | Sato ........................... 380/240 |
| 6,434,648 | B1 | * | 8/2002 | Assour et al. ............... 710/305 |
| 6,662,193 | B1 | * | 12/2003 | Christensen ............ 707/104.1 |
| 6,671,687 | B1 | * | 12/2003 | Pederson et al. ................ 707/9 |
| 6,704,118 | B1 | * | 3/2004 | Hull et al. .................. 358/1.15 |
| 6,789,152 | B2 | * | 9/2004 | Hoese et al. ................ 710/305 |
| 6,857,076 | B1 | * | 2/2005 | Klein ......................... 713/189 |
| 7,031,471 | B2 | * | 4/2006 | Stefik et al. ................. 380/231 |
| 7,058,696 | B1 | * | 6/2006 | Phillips et al. .............. 709/217 |
| 7,072,942 | B1 | * | 7/2006 | Maller ....................... 709/206 |
| 7,165,152 | B2 | * | 1/2007 | Blumenau et al. ........... 709/152 |
| 7,260,727 | B2 | * | 8/2007 | Fougeroux et al. .......... 713/189 |
| 7,290,148 | B2 | * | 10/2007 | Tozawa et al. .............. 713/189 |
| 7,330,908 | B2 | * | 2/2008 | Jungck ....................... 709/246 |
| 7,546,353 | B2 | * | 6/2009 | Hesselink et al. ........... 709/216 |
| 7,568,110 | B2 | * | 7/2009 | Buer et al. .................. 713/189 |
| 2001/0007975 | A1 | * | 7/2001 | Nyberg et al. ................... 705/1 |
| 2002/0029285 | A1 | * | 3/2002 | Collins ....................... 709/232 |
| 2002/0065938 | A1 | * | 5/2002 | Jungck et al. ............... 709/246 |
| 2002/0085567 | A1 | * | 7/2002 | Ku et al. ..................... 370/396 |
| 2002/0091935 | A1 | * | 7/2002 | Smith et al. ................ 713/189 |
| 2002/0104008 | A1 | * | 8/2002 | Cochran et al. ............. 713/200 |
| 2002/0114453 | A1 | * | 8/2002 | Bartholet et al. .............. 380/44 |
| 2002/0143885 | A1 | * | 10/2002 | Ross, Jr. ..................... 709/207 |
| 2002/0184494 | A1 | * | 12/2002 | Awadalla .................... 713/160 |
| 2003/0046238 | A1 | * | 3/2003 | Nonaka et al. ................ 705/51 |
| 2003/0065941 | A1 | * | 4/2003 | Ballard et al. ............... 713/201 |
| 2003/0070099 | A1 | * | 4/2003 | Schwartz et al. ............ 713/202 |
| 2003/0084281 | A1 | * | 5/2003 | Abiko et al. ................ 713/154 |
| 2003/0172149 | A1 | * | 9/2003 | Edsall et al. ................ 709/224 |
| 2003/0187937 | A1 | * | 10/2003 | Yao et al. .................... 709/206 |
| 2003/0196098 | A1 | * | 10/2003 | Dickinson et al. ........... 713/188 |
| 2006/0149746 | A1 | * | 7/2006 | Bansod et al. ................ 707/10 |
| 2007/0083657 | A1 | * | 4/2007 | Blumenau et al. ........... 709/226 |
| 2008/0168304 | A1 | * | 7/2008 | Flynn et al. ..................... 714/7 |

FOREIGN PATENT DOCUMENTS

| | | |
|---|---|---|
| WO | 98/55912 | 12/1998 |
| WO | 02/27445 | 4/2002 |

OTHER PUBLICATIONS

Stevens, "TCP/IP Illustrated, vol. 1: The Protocols", section 2.4, Addison Wesley, Dec. 1993.*

* cited by examiner

METHOD AND APPARATUS FOR IN-LINE SERIAL DATA ENCRYPTION

This application claims the benefit of U.S. Provisional Application No. 60/376,580, filed Apr. 30, 2002, which is hereby incorporated herein in its entirety by reference.

BACKGROUND OF THE INVENTION

The present invention relates to encryption of data stored by processor-based systems. In particular, it relates to encryption of data transmitted from a host computer to a target device such as a storage system, where the encryption is carried out in-line with the data channel and transparently to a user of the host computer.

As ever greater amounts of sensitive data are stored in storage systems that are subject both to physical compromise and to computer-based attacks, it becomes more important that data stored in such locations be secure in the case that physical control over the storage system is lost. Storing the data at an insecure site in an encrypted form allows the storage facility itself to be considered unclassified in certain circumstances, since the data will not be compromised if unauthorized access is gained.

Some current systems provide for essentially real-time encryption and decryption of the data as it is written to and retrieved from the storage system. One way to provide security to sensitive data is to use in-line encryption and decryption of the data, such as encryption of data as it is transmitted over a parallel bus from a host computer to a storage device. Such systems would be generally unsuitable for a serial-channel setting, where the speed of encryption and related processing necessary is very high, especially in systems that use such protocols as the Firewire® (IEEE 1394) standard or Ethernet protocols, such as Gigabit Ethernet.

Encryption of transmitted data is carried out by conventional systems, which inhibits anyone intercepting the transmission from reading the data. However, there are other manners in which a computer user may engage in illicit activities. For instance, data may be transferred out of a secure location by embedding it in particular ways inside control or status headers. In addition, a user outside a secure system may mount an attack on the system by including address pointers or other disallowed data in the headers. Additionally, the pattern of data access may itself be a manner in which a device, such as a storage device, may be targeted to send information to unauthorized observers.

A system is needed whereby transmission of data in a serial channel can be accomplished in-line and in real time, where the data and control information can be treated separately for both encryption purposes and for handling various types of attacks and covert processes embedded in or achieved by the transmitted information.

It would be advantageous to provide such a system which could be used in connection with existing storage systems, without alteration of the storage systems themselves.

SUMMARY OF THE INVENTION

A system according to an embodiment of the invention includes an encryption unit connected in-line on a serial channel connecting a host computer and a storage system, or some other source device(s) and target device(s). The encryption unit may be a processor-based unit with local memory and program module to carry out encryption, decryption and other functions of the invention. The invention also includes a processor-based system and/or network incorporating such an encryption unit, and methods of encrypting and carrying out other security functions on data packets sent along serial channels, and in some cases also parallel channels.

Data packets received serially at the encryption unit include a header with control information and the data itself. The data is separated from the header, encrypted, recombined with the header, and transmitted to the target device, all accomplished in real time and transparently to either the source device or the target device, which can configure their data packets in conventional manner, i.e. without any structure or control information added to accommodate the encryption unit.

The control information, which may include commands and status information, can be subjected to filtering and rejecting operations by the encryption unit, to pass through only a predetermined set of commands and/or to reject a predetermined set of commands. Control information may also converted or mapped onto equivalent or substitute control information for transmission on to the target device, which inhibits disallowed activities such as the use of the packet headers as covert channels. Specific types of information, including data and data pointers, may also be blocked from being transmitted via the packet headers.

The encryption unit is configured to operate at sufficiently fast speeds such that the data encryption and decryption and control information mapping, filtering, etc. is carried out substantially at the transmission speed of the serial channel(s). In some embodiments, the encryption unit can be built into a serial bus connector, e.g. a Firewire® connector, and used as a hot-pluggable security device carrying its own logic (hardware, software and/or firmware). Building the encryption unit in a modular fashion, such as by separating the security functions from serial interface functions, allows for less time-consuming and less expensive upgrades and replacements.

Other systems, methods, functions and advantages of the invention, or combinations of these, will be or become apparent to one skilled in the art based upon the following description.

DETAILED DESCRIPTION OF PREFERRED EMBODIMENTS OF THE INVENTION

Figure 1:
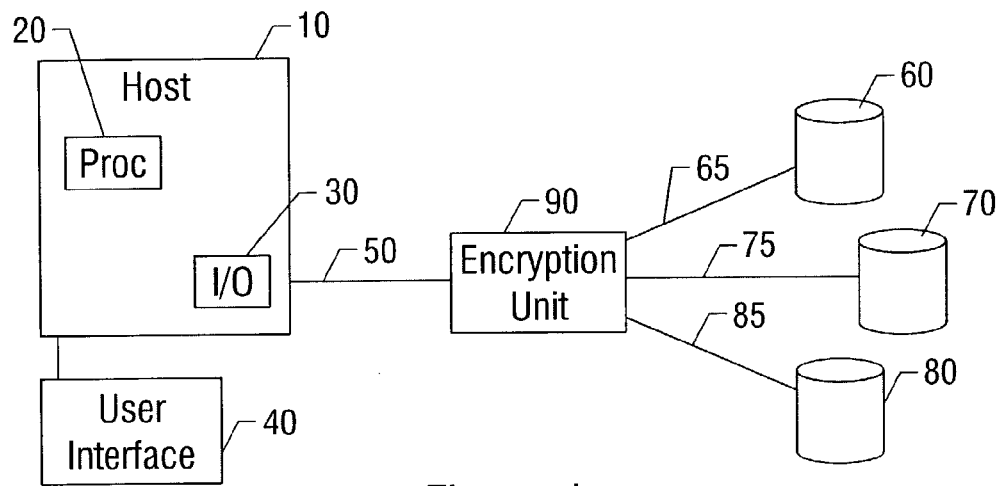
FIG. 1 is a diagram of a system incorporating features of the present invention.

FIG. 1 shows a processor-based system 10 such as a workstation or personal computer. The system 10 includes at least one processor 20 and a conventional input-output (I/O) subsystem 30, which communicates with user interface 40 and a serial channel or bus 50. Typical user interface devices may include a keyboard, mouse, track ball, monitor, and other human-interface input and output devices.

The serial channel 50 conventionally includes switches, router, hubs and the like, and network devices such as printers, servers, other workstations, and storage devices may be connected to the channel 50. Storage devices 60-80, such as disk drives, storage arrays or servers, tape backup units and the like are connected to the serial channel 50 via an in-line encryption unit 90. The I/O subsystem 30 and connected devices 60-90 are in some embodiments of conventional design.

The encryption unit 90 includes a processor 100 with associated memory 105, an encrypt module 110 and an transmit module 120. The modules 110 and 120, as with other modules or units discussed herein, may be implemented as any suitable logic configured to carry out the functions described. As used herein, the term "logic" refers to hardware (e.g. a board, circuit, chip, etc.), software and/or firmware configured to carry out operations according to the invention. For instance, features of the invention may be accomplished by specific circuits under control of a computer program or program modules stored on a suitable computer-readable medium, where the program modules are configured to control the execution of memory operations using the circuitry of the interface 80.

One advantage of implementations that include at least some software or firmware is that updates, modifications and patches are generally easier and less expensive to install.

Thus, the encrypt unit 90 may be a hardware/firmware device using an FPGA (field-programmable gate array) or a purely hardware device, such as an ASIC (Application Specific Integrated Circuit). These hardware implementations, including well known self-checking and authentication techniques can be used to restrict alteration of the unit 90. In this case, the encrypt module 110 and transmit module 120 may be substantially hardware-implemented. These would be suitable for Type I communications, or as specified for NSA (National Security Agency) TS/SCI (top secret/sensitive compartmented information).

Alternatively, the encryption unit 90 might be a processor-based system or subsystem, while the encrypt module 110 and transmit module 120 are software that is executed by the unit 90. In yet another embodiment, the encryption unit 90 may take the form of a software program itself executed on a processor (in which case the processor 100 is separate from, and does not form a part of, the encryption unit 90 itself), and the encrypt module 110 and transmit module 120 may in this case be software modules forming part of or in communication with the encryption unit 90.

Although much of the present invention will be described in terms of a host computer sending data to a storage system, which is encrypted during transmission, the designations of host computer and storage system are symmetrical, and in general the invention can be implemented in setting of any source device transmitting data to any one or more target devices, where security is desired for the contents of the message and to prevent unauthorized access to at least one of the devices.

In addition, although the present disclosure is described in detail with respect to serial channels and serial data transmission protocols, many of the concepts may be applied to a parallel data setting, and thus when serial transmission is mentioned it should be taken as also including parallel transmission where this is applicable to the functions described.

A block encryption (or cipher) method may be used to encrypt data in the present invention, and/or other encryption methods may be used, such as a stream cipher method, in which case the encryption unit 90 may include auxiliary address regions for keys, key fragments, and initialization vectors.

The embodiment of FIG. 1 is suitable where target devices 60-80 are in an unsecured environment, e.g. they reside in an unclassified facility and thus reliable encryption is used. The host 10 may suitably be in classified facility, and thus may store and pass data in an unencrypted manner. In this case, the encryption unit 90 may be on the boundary between the two environments (classified and unclassified), and may be associated with one or the other. In some embodiments, two encryption units may be used, one at the boundary of each environment, with a network (e.g. the Internet) between them for passing secure, encrypted data.

Figure 3:
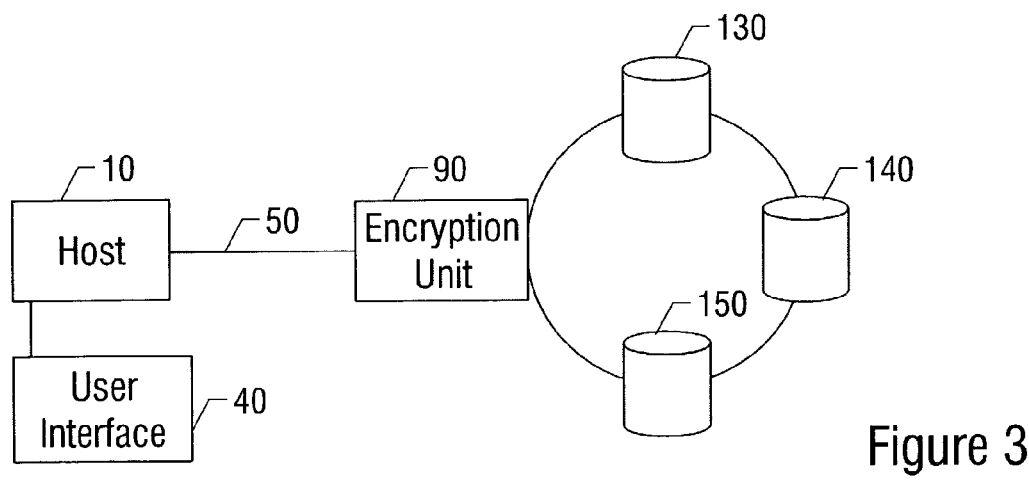
FIGS. 3-6 are diagrams of alternative embodiments of systems according to the invention.

In FIG. 3, the encryption unit 90 communicates with each of several (here, three) target devices such as storage devices 130-150, which are connected in a network topology such as a serial ring topology.

Figure 4:
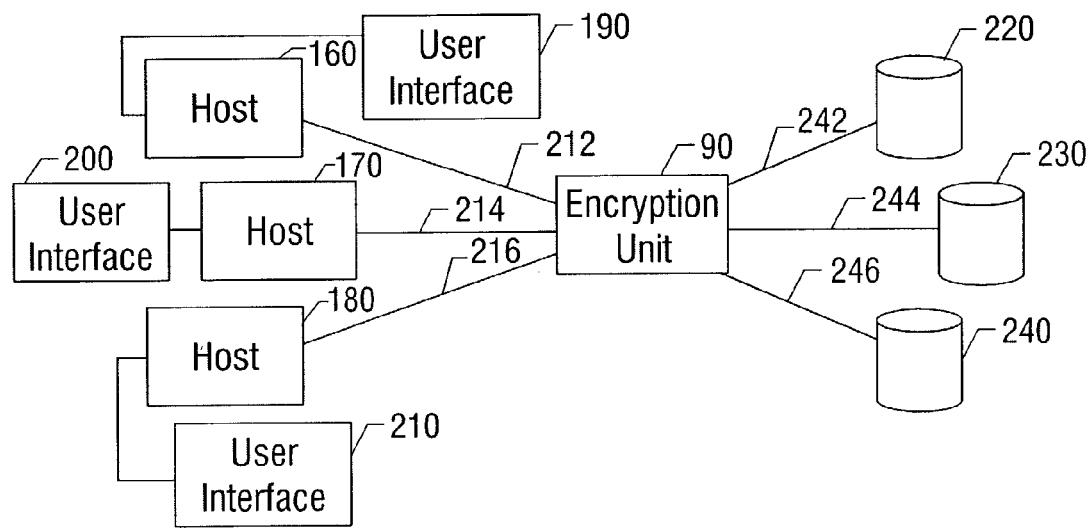

FIG. 4 illustrates an embodiment in which host devices 160-180 having user interfaces 190-210, respectively, communicate over separate serial channels 212-216 to encryption unit 90 and to target devices 220-240, each of which is connected via a point-to-point serial connection (242-246, respectively) to the encryption unit 90.

Figure 5:
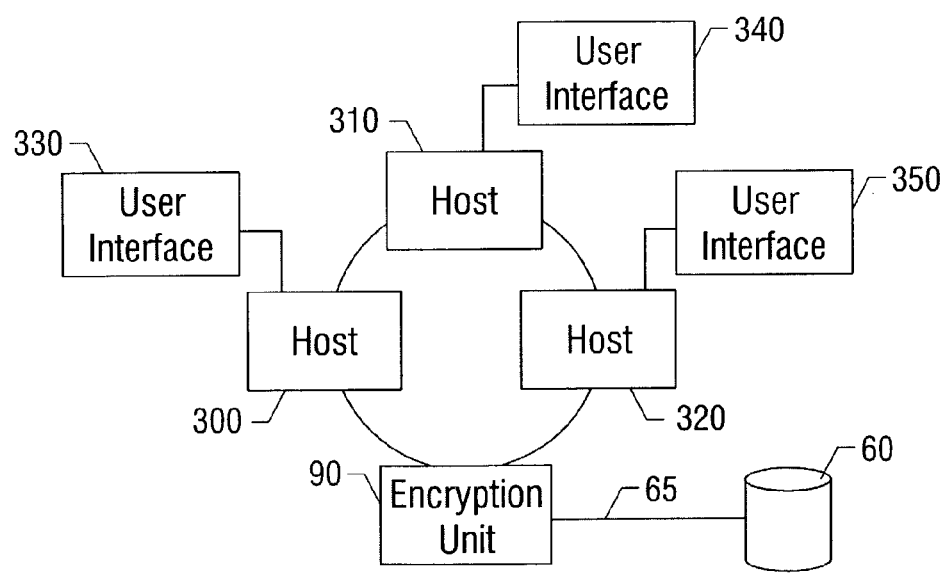

FIG. 5 illustrates an embodiment in which several (here, three) host devices 300-320 with associated user interfaces 330-350, respectively, are connected in a network such as a serial ring topology, and all are in communication with encryption unit 90.

Figure 6:
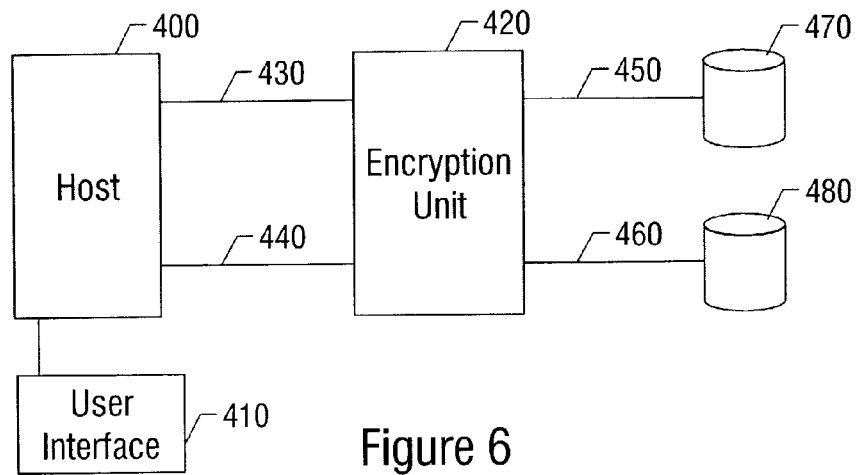

FIG. 6 illustrates an embodiment in which a host 400 with associated user interface 410 is connected via separate serial channels 430 and 440 to an encryption unit 420 of the invention, which itself is connected via separate serial channels 450 and 460 to target devices such as 470 and 480, respectively.

Figure 7:
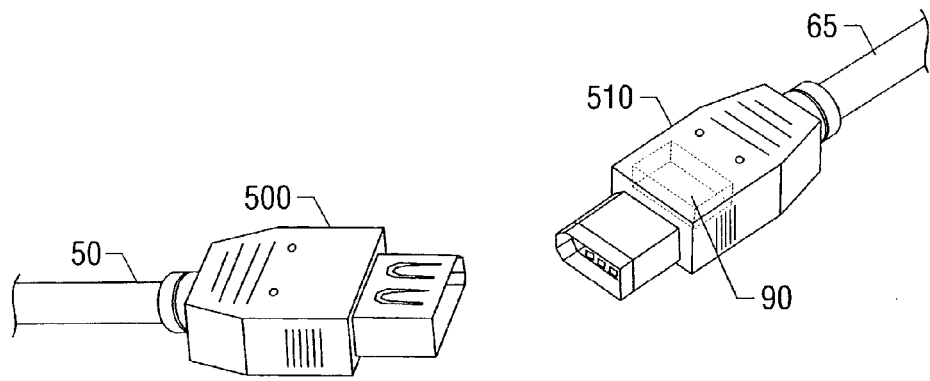
FIG. 7 is an illustration of an embodiment of the invention as incorporated into a serial channel connector.

FIG. 7 is a diagram of an embodiment of the invention in which the encryption unit 90 is carried within one connector of the serial channel 50-65. For instance, bus 50 and bus 65 may be Firewire® cables, with bus 50 having one connector 500 and bus 65 having a mating connector 510. In this case, any data passing through bus 65 to storage unit 60 (see FIG. 1) is encrypted or otherwise treated as described below, and thus storage unit 60 never receives unencrypted classified information.

In this embodiment, the connectors 500 and/or 510 may be hermetically sealed and/or otherwise hardened for rough environments. Alternatively or in addition, the buses 50 and/or 65 may carry power and/or additional signals to the connected devices.

In another embodiment, the encryption unit 90 may be implemented on a plug-in card for either a host system or a target device, such as an a PCI card or a daughterboard that connects to a motherboard of the receiving system.

The serial channels herein may thus be Firewire® (IEEE 1394) protocol buses, or they may be any of a number of other suitable serial channels, such as serial ATA, serial SCSI, fibre channel, and so on.

The following discussion will be directed to an embodiment in which a single host 10 communicates with a single target device (e.g. storage device 60), but it will be understood that one-to-multiple or multiple-to-one mappings in a variety of configurations, as in FIGS. 1 and 3-6 or other architectures, may additionally or alternatively be used in connection with the invention. Data may be treated in similar or symmetrical fashion (e.g. for encrypting and/or decrypting) when passed in either direction between the host device(s) and target device(s).

In architectures where multiple target devices are available, the encryption unit can be configured to distributing incoming requests from a host to multiple storage devices through an address mapping scheme—for example—

| Host Address | Encryption Unit Address |
|---|---|
| 0 | Storage Medium 1, block 0 |
| 1 | Storage Medium 2, block 0 |
| 2 | Storage Medium 1, block 1 |
| 3 | Storage Medium 2, block 1 |
| . | . |
| . | . |
| . | . |

This example represents a simple striping, which might be done for performance reasons. Other commonly used mapping schemes could be used to achieve redundancy (such as mirroring, parity, Reed-Solomon Codes) or increases in capacity (concatenation).

These types of address mappings can also be used to support security functions for different users and different security levels. Because no standardized method exists today to associate users with data accesses on media data channels this invention offers two alternative approaches.

First, in the case of a single input to the encryption unit, the internal security function of the encryption unit will typically, in conventional encryption systems, have a security function that identifies the user, his initialization vector and the permitted address space to the encryption unit. For example, a particular user could be mapped to read or write a subset of all possible addresses. When this user identification is changed, then the mapping of address spaces and encryption keys can change accordingly. This allows the host system and all of its connections to change from one security level to another as a function of time and user authentication.

Second, this security model also easily supports multiple security levels of data being stored and accessed simultaneously. This is permitted by providing multiple independent physical inputs to the encryption unit. Each input may be associated with a predetermined security level or compartment via one host profile and its associated initialization vectors and keys. Existing trusted routing mechanisms can be used within the controlled confines of the encryption unit to route the data from the appropriate input to the cryptographic core, initialized with the key and algorithm appropriate for that input, and mapped to the subset of the available data storage medium addresses allocated to that security level.

The designations "host" and "target" devices are for convenience, and in fact either device may act as a host or target at different times. The host and target devices may in fact be substantially identical in function, such as in a peer-to-peer network.

Encryption of Data

Figure 8:
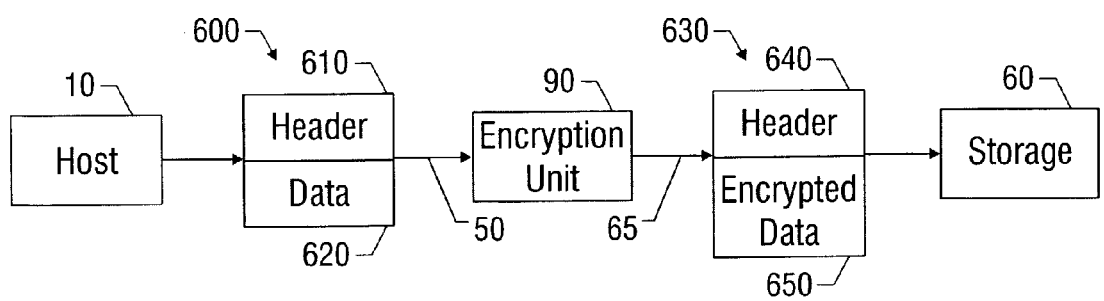
FIG. 8 is a block diagram illustrating an embodiment of the invention configured to encrypt transmitted data.

The encryption unit 90 may be used for encryption of data transmitted over bus 50 from the host 10. As shown in FIG. 8, a data packet or block 600 is transmitted with a header 610 and data 620, in a serial fashion, to the encryption unit, which strips off the data 620 and subjects it to an encryption operation.

The encryption operation will typically use a random or pseudo-random number generation process, in which case the seed for the process can be such information as the target address for the data packet 600, the host identifier for the host 10, and any other desired information. This seed can be used both in the encryption and decryption procedures.

The encryption and decryption processes may be carried out by the same engine (e.g. unit, processor, module, etc.), or separate encryption and decryption engines may be provided. The encryption unit may include logic and access to information sufficient to perform key loading and encryption algorithm loading and initialization. This can be done in a number of conventional manners, with a common feature in some embodiments being that a secure mechanism is provided for loading the encryption and decryption program modules or methods, initializing the cryptographic engine (see FIG. 11), loading the session keys, and/or switching keys and initialization vectors and algorithms based upon data requests received on the data channel. In addition, in some embodiments logic configured to provide secure erasure of keys and encryption and/or decryption algorithms is included.

The encryption unit 90 is set up such that the host 10 can transmit and receive control information (including commands, header data, etc.) and data in a normal fashion, i.e. with no additional steps, information or packet modification needed to accommodate the encryption operation. Thus, the encryption unit 90 is transparent to the data packets, and the host 10 operates in the same manner as if the target device(s) were not storing data in an encrypted form. This has the advantage that it supports physical and logical operations of the channel being used, and thus accommodates whatever standard is used for that particular type of channel.

For example, a command from the host 10 that requests information such as the manufacturer, serial number, etc. of the target device is replied to by the encryption unit 90 in the same manner in which the target device itself would have responded if the encryption unit were not present.

This can be accomplished in several manners. In one embodiment, the encryption unit 90 can send the inquiry to the target device, obtain the response, and pass this information back to the host 10. Alternatively, the encryption unit could maintain the needed information locally, such as in its local memory 105, and respond with the locally stored information. The latter embodiment has the advantage that the request can be fulfilled without accessing the target device, freeing up the target resources for other operations and allowing a quicker response to the host. It can also help prevent covert channel signaling by reducing the determinism of the input and output command traffic to the encryption unit. A host, attempting to signal a hostile observer on the data storage side of the encryption unit will be inhibited from predictably controlling the type of command that is sent to the data storage device, and from determining whether a command is sent at all. In this embodiment, the encryption unit can be provided with a module or mechanism by which it updates its information about host and/or target devices at predetermined times, e.g. either periodically or upon occurrence of predetermined events, such as modification of the network, rebooting of given devices, and so on.

Control Information Modification

Figure 9:
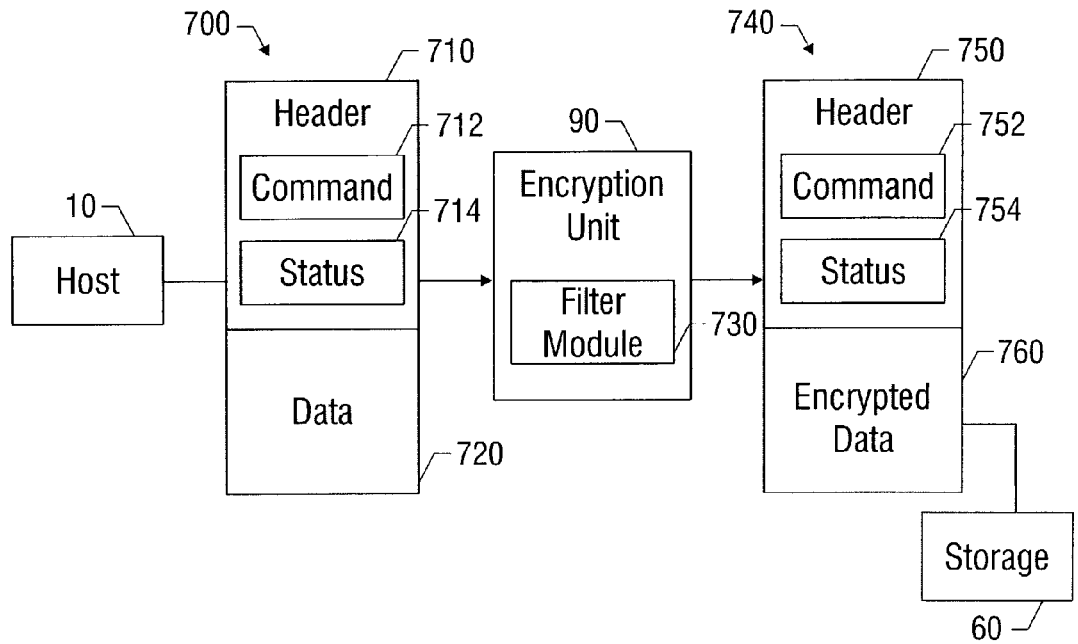
FIG. 9 is a block diagram illustrating an embodiment of the invention configured to filter transmitted data packets.

In addition or as an alternative to encryption of the data 620, the encryption unit 90 may be configured to replace control information with equivalent or substitute control information, e.g. command or function "tokens". In one embodiment, a packet 700 may be transmitted (see FIG. 9), with a header 710 including command and status information 712-714 and data 720.

The encryption unit in this embodiment includes a filter module 730, which may include a look-up table, a formula or other logic configured to pass only a predetermined allowed set of commands, status and other information or categories of information (e.g. excluding certain types of data, address pointers and the like) that may be included in the header 710. Alternatively or additionally, the filter module may include logic configured to reject a predetermined set of information or categories of information, e.g. to reject certain types of data, address pointers, and so on. Thus, the filter module 730 may be configured as an information or command pass filter or blocking filter for any control information that may be included in the packet 700, whether or not in the header.

Typical allowed commands will be read, write, and other commands associated with data or memory access and storage.

Figure 10:
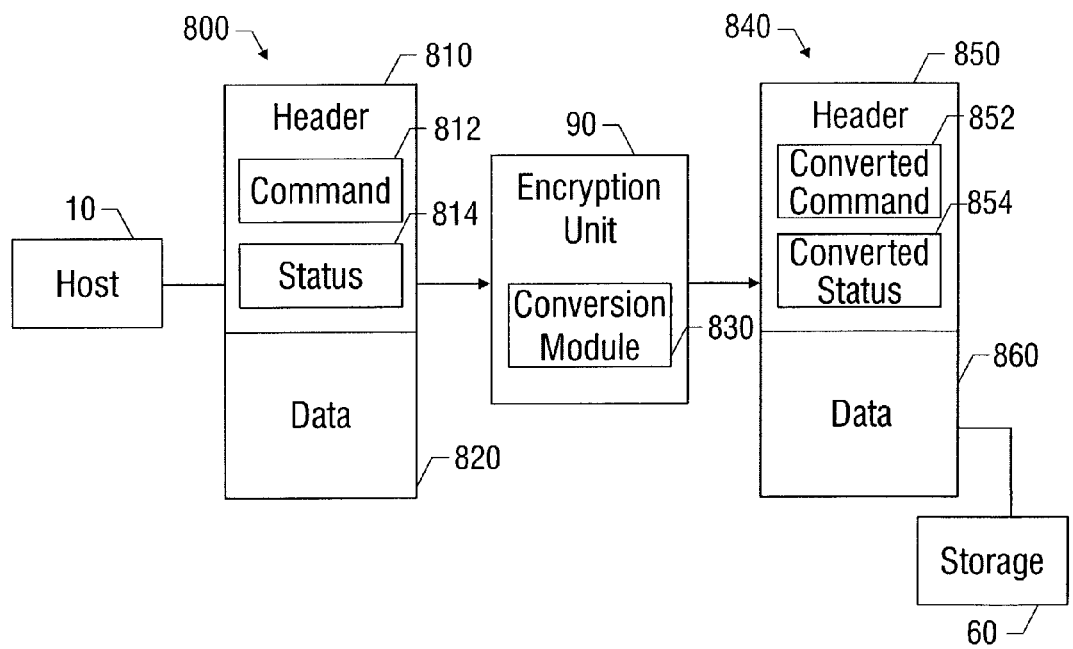
FIG. 10 is a block diagram illustrating an embodiment of the invention configured to convert transmitted control information.

FIG. 10 shows an alternative embodiment wherein data packet 800 includes a header 810 with command and status information 812-814 and data 820 and is sent to encryption unit 90 for transmission to a target device 60. In this embodiment, the encryption unit 90 includes a conversion module 830, which includes logic configured to convert commands, status, address and other information to equivalent information to pass on to the target device 60. The conversion process can be used to ensure that covert signaling or "stealth packets" (e.g. by putting "hidden" values inside the reserved fields of legitimate commands) cannot occur or be sent between the host 10 and the target 60 by inclusion of disallowed information in the packet 800 (either the header 810 or the data 820).

Both the filter unit and/or conversion unit may additionally be used to prevent the passing of malformed commands, i.e. commands that do not logically match the protocol or target device, have been corrupted, and so on The conversion unit may additionally or alternatively include logic configured to rearrange the order in which packets are received, by processing the commands or requests relating to the packets in an order other than the order in which they arrived at the encryption unit, and/or by responding to the commands or requests in a different order than that in which they were received, and/or by altering the timing of the transmission of the packets in an unpredictable way while still maintaining the functionality of the underlying media protocol. This provides additional methods for preventing the transmission of covert data from one device to another.

The filter unit and/or conversion unit may be modified from time to time as needed or on a predetermined schedule to remove or add allowed commands or other functions or information, to remap commands from the host to the target, and so on.

Data Encryption Unit Interfaces

Figure 2:
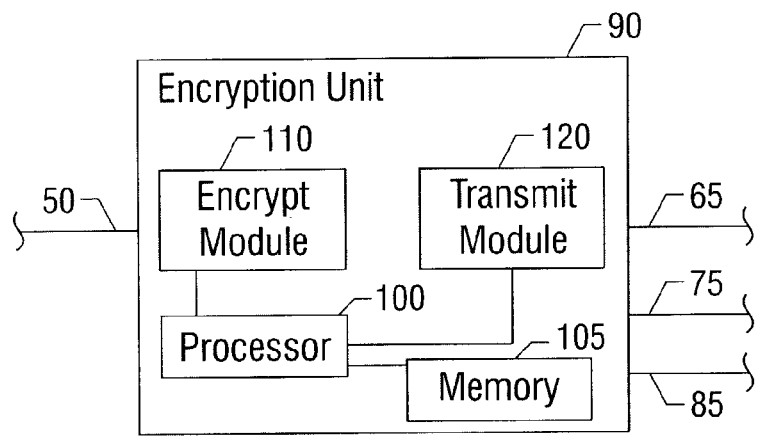
FIG. 2 is a block diagram of an encryption unit according to the invention.
Figure 11:
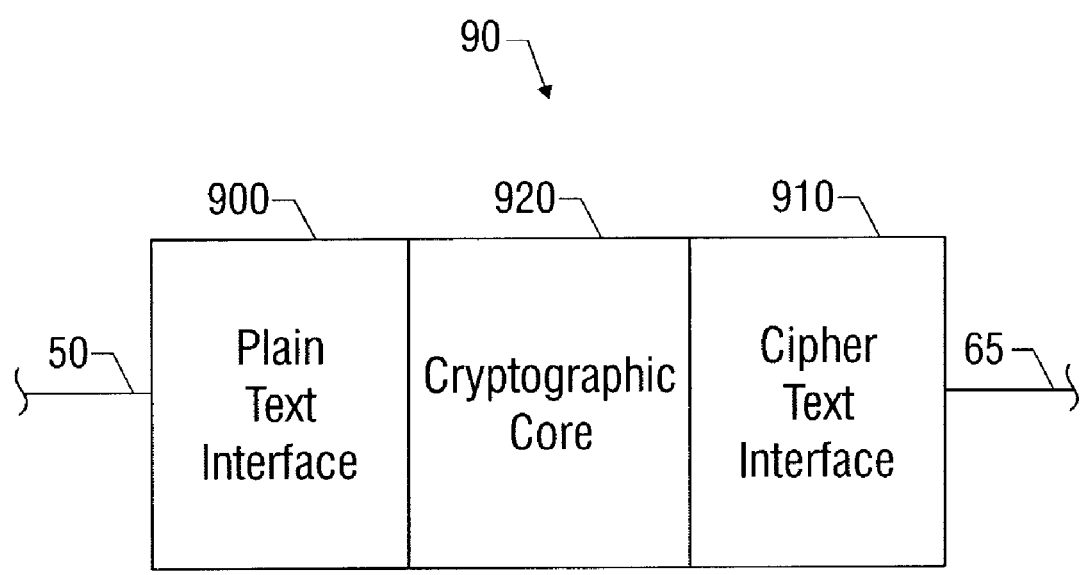
FIG. 11 is a block diagram illustrating logical layers in one embodiment of the invention.

The data encryption unit 90 may be implemented as a device with three logic layers, as illustrated in FIG. 11. A plain text interface 900 couples to serial channel 50, i.e. is on the side of the unit 90 presented to a channel in which unencrypted data may be sent. A cipher text interface 910 couples to serial channel 65, i.e. is on the side of the unit 90 presented to a channel in which encrypted data may be sent. Between these two layers is the cryptographic core 920, which may include the modules or other logic discussed above and shown in FIG. 2.

The layers 900-920 need not be physically distinguishable features of the encryption unit 90, but may be integrated into a single effective device. However, if either or both of the interfaces 900-910 is separable from the cryptographic core 910, they may be replaced and thus the unit 90 may be upgraded or repaired without replacing the core 920.

The plain text interface 900 may be configured to emulate the behavior of a conventional target device, e.g. storage medium, so that hosts or other devices (such as processors, other storage media, other encryptors, etc.) can function normally without requiring any alteration to their hardware or software in order to interact with the target device. The filter module 730 and/or conversion module 830 discussed above may be included in the plain text interface. In addition, the plain text interface 900 may include logic configured to properly format and transport incoming packets to the cryptographic core 920, e.g. assembling packets received serially and by stripping data from headers for processing by the encrypt module 110.

The cipher text interface 910 performs functions similar or mirrored to the plain text interface 900, such as rebuilding data packets from the components provided by the cryptographic core, including the header (with unaltered, filtered and/or converted control information) and the encrypted data, and converting these back into appropriate serial form for the channel 65. The reverse functions are performed for data packets arriving on the channel 65 at the encryption unit 90, e.g. stripping off the data portion of the packet for decryption while providing the control information to the cryptographic core for appropriate processing.

The interfaces 900 and/or 910 may also include logic configured to perform protocol conversion or data block size conversion, e.g. between any two or more protocols desired, depending upon the serial channels connected to the host and target device(s).

When the encryption unit is used in a configuration with either multiple hosts and/or multiple targets (as in FIGS. 1 and 3-6), packets from or to different devices may be treated differently. FIG. 6 illustrates a configuration where the separate channels 430 and 440 may be received via different interfaces at the encryption unit 420, and the received data packets are likewise transmitted over separate channels 450-460, respectively, to the target devices 470-480. This configuration presents a straightforward manner of implementing a mapping and/or partitioning embodiment which treats different protocols, sources and destinations differently. There may be differences driven by the nature of the devices (e.g. fibre channel vs. serial SCSI), and/or there may be configurable security criteria, such as providing certain levels of encryption, a single key or multiple keys, integrity checking, and so on.

The encryption unit 90 need not process data packets on a block-size basis. The serial channel setting allows any arbitrary number of bits to be identified as the encryption stream size, and this can be varied as desired, which can make an attack on the encrypted data less likely to succeed, since the resulting formatting is not in a conventional block-data form. In this embodiment, the encryption unit or target and/or host device(s) may include logic to rebuild the data blocks from the arbitrary lengths of bitstreams.

This invention thus provides a high-speed, in-line encryption and security system that can accommodate protocols of various types, such as multiple types of serial data transmission. Security for both the data itself and to inhibit or prevent covert channel transmissions, with different levels of security for different channels and devices, is provided without the need to modify either the source or destination device(s).

If a storage device is accessed by unauthorized users, the meaning of the stored data will be protected via the encryption of the original data. If the encryption unit itself and the associated storage device are accessed by unauthorized users, the encrypted data will be unavailable, if the cryptographic key(s) have been deleted from the encryption unit or destroyed.

The encryption unit in the foregoing description has in each case been placed in-line between the host(s) and the target device(s). It is also possible to implement and architecture where the encryption unit is not directly in line, but still provides many or all of the encryption, filtering, conversion and other functions described above.

Other systems, methods, functions and advantages of the invention, or combinations of these, will be or become apparent to one skilled in the art based upon the figures and the foregoing description. It is intended that all such additional systems, methods, functions, advantages and combinations be included within this description and within the scope of the invention, and be protected by the accompanying claims.

What is claimed is:

1. An encryption system, including:
    an input connection configured to receive, from a first device, serial, plain-text data and associated control information for a second device, said control information including at least one command directed to operation of the second device to store and retrieve data,
    an output connection configured to connect to the second device;
    an encrypt module configured: (a) to encrypt the data, (b) to filter disallowed control information, and (c) to leave allowed control information unencrypted;
    a transmit module configured to transmit the encrypted data and control information to the second device;
    wherein the control information is disallowed or allowed based on at least some of the at least one command directed to operation of the second device to store and retrieve data.

2. The encryption system of claim 1, wherein:
    the first device includes a processor-based system; and
    the second device includes a storage system.

3. The encryption system of claim 1, wherein the encrypt module is configured to encrypt the data in multiple data subsets of a predetermined size.

4. The encryption system of claim 3, wherein the predetermined size is variable.

5. The encryption system of claim 4, wherein the transmit module is further configured to transmit size information identifying the predetermined size to the second device.

6. An encryption system, including:
    an input connection configured to receive, from a first device, bits of serial, plain text data and associated control information for a second device, said control information including at least one command directed to operation of the second device to store and retrieve data;
    an output connection configured to connect to the second device;
    an encrypt module configured: (a) to encrypt the data bits, (b) to filter disallowed control information, and (c) to leave allowed control information unencrypted;
    a control translation module configured to remove at least one command from the received control information and to replace the removed command with an equivalent command; and
    a transmit module configured to transmit the encrypted data bits and the control information including the equivalent command to the second device
    wherein the control information is disallowed or allowed based on at least some of the at least one command directed to operation of the second device to store and retrieve data.

7. The encryption system of claim 6, wherein the control translation module is further configured to reject at least one command that does not correspond to a predetermined set of allowed commands.

8. The encryption system of claim 6, wherein the control translation module is further configured to reject at least one command that corresponds to a predetermined set of disallowed commands.

9. A method of encrypting data that is sent from a first device via a serial bus and directed to a second device, including the steps of:
    receiving the data from the first device along with associated control information for the second device, said control information including a command directed to operation of the second device to store and retrieve data;
    encrypting at least a portion of the data;
    filtering disallowed control information, and
    transmitting the encrypted data with allowed control information to the second device, where the allowed control information is transmitted in an unencrypted form
    wherein the control information is disallowed or allowed based on at least some of the at least one command directed to operation of the second device to store and retrieve data.

10. The method of claim 9, wherein the portion of data that is encrypted in the encrypting step has a predetermined size.

11. The method of claim 10, wherein the predetermined size is variable.

12. The method of claim 10, wherein the transmitting step further includes the step of transmitting information relating to the predetermined size to the second device.

13. A method of encrypting data that is sent from a first device via a serial bus and directed to a second device, including the steps of:
    receiving the data along with associated control information, said control information including a command directed to operation of the second device to store and retrieve data;
    encrypting at least a portion of the data;
    determining an equivalent command for at least one received command associated with the control information;
    replacing the received command with the equivalent command;
    transmitting the encrypted data with the associated control information including the equivalent command to the second device, where the associated control information is transmitted in an unencrypted form;
    rejecting data associated with a command for which no equivalent is determined.

14. A method of encrypting data that is sent from a first device via a serial bus and directed to a second device, including the steps of:
    receiving the data along with associated control information, said control information including a command directed to operation of the second device to store and retrieve data;
    encrypting at least a portion of the data;
    determining an equivalent command for at least one received command associated with the control information;
    replacing the received command with the equivalent command;
    transmitting the encrypted data with the associated control information including the equivalent command to the second device, where the associated control information is transmitted in an unencrypted form;
    rejecting data associated with a command that is determined to be one of a predetermined set of disallowed commands.

15. A data transmission system, including:
a computer having a serial communications port;
a serial bus coupled to the serial communications port;
a recipient device coupled to the serial bus; and
an encryption unit connected in-line to the serial bus between the computer and the recipient device, the encryption unit including an encrypt module configured to receive data and associated control information transmitted from the computer via the serial bus and to encrypt the data, said control information including a command directed to operation of the recipient device to store and retrieve data; and
a transmit unit configured to read and transmit the control information with the encrypted data to the recipient device; and
the transmit unit is configured to block data associated with a command for which no predetermined equivalent command is located.

16. The system of claim 15, wherein the recipient device includes a decryption module configured to decrypt the transmitted data.

17. The system of claim 15, wherein:
the encrypt module includes a command replacement module configured to replace at least one command associated with the control information with a predetermined equivalent command.

18. The system of claim 15, wherein:
the encrypt module includes a command replacement module configured to replace at least one command associated with the control information with a predetermined equivalent command; and
the transmit unit is configured to transmit only data associated with commands for which predetermined equivalent commands are located.

19. The system of claim 15, including a filtering unit configured to filter transmitted data based upon at least one predetermined criterion.

20. The system of claim 19, wherein the criterion includes detection of a disallowed form of data associated with the control information.

21. The system of claim 20, wherein the disallowed form of a data includes an address pointer.

22. The system of claim 20, wherein the disallowed form of data includes at least one command associated with a predetermined type of attack.

23. The system of claim 15, wherein:
the encryption unit is further configured to receive recipient device data and associated control information transmitted from the recipient device via the serial bus and directed to the computer, and to encrypt the recipient device data; and
the transmit unit is further configured to transmit the encrypted recipient device data with its associated control information to the computer.

24. The system of claim 23, wherein the computer includes a decryption module configured to decrypt the encrypted recipient device data.

* * * * *